United States Patent
Hirai et al.

(10) Patent No.: US 8,937,419 B2
(45) Date of Patent: Jan. 20, 2015

(54) RADIALLY ANISOTROPIC RING R-TM-B MAGNET, ITS PRODUCTION METHOD, DIE FOR PRODUCING IT, AND ROTOR FOR BRUSHLESS MOTOR

(75) Inventors: Nobuyuki Hirai, Kumagaya (JP); Mitsutoshi Natsumeda, Mishima-gun (JP)

(73) Assignee: Hitachi Metals, Ltd., Tokyo (JP)

( * ) Notice: Subject to any disclaimer, the term of this patent is extended or adjusted under 35 U.S.C. 154(b) by 1219 days.

(21) Appl. No.: 12/666,245

(22) PCT Filed: Jun. 23, 2008

(86) PCT No.: PCT/JP2008/061423
§ 371 (c)(1),
(2), (4) Date: Dec. 22, 2009

(87) PCT Pub. No.: WO2009/001801
PCT Pub. Date: Dec. 31, 2008

(65) Prior Publication Data
US 2010/0181859 A1    Jul. 22, 2010

(30) Foreign Application Priority Data

Jun. 28, 2007  (JP) .................................. 2007-170538
Nov. 16, 2007  (JP) .................................. 2007-298547

(51) Int. Cl.
*H02K 21/12*    (2006.01)
*H01F 1/057*   (2006.01)
(Continued)

(52) U.S. Cl.
CPC .......... *H01F 41/028* (2013.01); *H01F 41/0266* (2013.01); *H02K 1/2733* (2013.01); *H02K 15/03* (2013.01); *H01F 1/0576* (2013.01); *H01F 7/021* (2013.01)

USPC ............. 310/156.43; 419/12; 419/38; 29/596

(58) Field of Classification Search
CPC .............. H02K 1/27; H01F 7/02; H01F 41/02
USPC .................. 310/156.13, 156.43; 29/596, 598; 419/12, 38
See application file for complete search history.

(56) References Cited

U.S. PATENT DOCUMENTS 2,736,827 A * 2/1956 Buchmann ................ 310/156.51
4,150,927 A * 4/1979 Steingroever ..................... 425/3
(Continued)

FOREIGN PATENT DOCUMENTS

JP    58181802 A  * 10/1983
JP    03-265102 A    11/1991
(Continued)

OTHER PUBLICATIONS

Machine Translation JP2005079423 (2005) JP06124822 (2004) and JP2005304178 (2005).*

(Continued)

*Primary Examiner* — Tran Nguyen
*Assistant Examiner* — Jose Gonzalez Quinones
(74) *Attorney, Agent, or Firm* — Sughrue Mion, PLLC

(57) ABSTRACT

A method for producing a radially anisotropic ring magnet having at least one axial groove on the inner surface comprises using a die comprising a cylindrical, magnetic core, a magnetic sleeve having an axial ridge in alignment with the groove on the outer surface and disposed on an outer peripheral surface of the core, and an outer, cylindrical die member defining a cavity for forming the ring magnet with the magnetic sleeve, and compression-molding magnet powder charged into the cavity while applying a magnetic field in a radial direction, and a radially anisotropic ring magnet substantially having a composition of R-TM-B, wherein R is at least one of rare earth elements including Y, TM is at least one of transition metals, and B is boron, having at least one axial groove on the inner surface, and magnetized such that centerlines between magnetic poles do not overlap grooves.

9 Claims, 10 Drawing Sheets

(51) Int. Cl.
  *H02K 15/16* (2006.01)
  *H01F 41/02* (2006.01)
  *H02K 1/27* (2006.01)
  *H02K 15/03* (2006.01)
  *H01F 7/02* (2006.01)

(56) References Cited

U.S. PATENT DOCUMENTS

| 4,151,435 A | * | 4/1979 | Jandeska et al. ......... 310/154.07 |
| 2005/0225190 A1 | | 10/2005 | Kinashi et al. |
| 2006/0158292 A1 | | 7/2006 | Ugai et al. |

FOREIGN PATENT DOCUMENTS

| JP | 06124822 A | * | 5/1994 |
| JP | 09-045568 A | | 2/1997 |
| JP | 09-097731 A | | 4/1997 |
| JP | 09-213521 A | | 8/1997 |
| JP | 10-177928 A | | 6/1998 |
| JP | 10177928 A | * | 6/1998 |
| JP | 10-201152 A | | 7/1998 |
| JP | 11-234930 A | | 8/1999 |
| JP | 2002-367846 A | | 12/2002 |
| JP | 2004274859 A | * | 9/2004 |
| JP | 2005-079423 A | | 3/2005 |
| JP | 2005079423 A | * | 3/2005 |
| JP | 2005-108948 A | | 4/2005 |
| JP | 2005-268385 A | | 9/2005 |
| JP | 2005-304178 A | | 10/2005 |
| JP | 2005304178 A | * | 10/2005 |
| WO | 2004/077647 A1 | | 9/2004 |

OTHER PUBLICATIONS

Machine Translation JP10177928 (1998).*
MAchine Translation JP2004274859 (2004).*
Chinese Office Action issued Jun. 5, 2012 for corresponding Application No. 200880022498.4.

* cited by examiner

RADIALLY ANISOTROPIC RING R-TM-B MAGNET, ITS PRODUCTION METHOD, DIE FOR PRODUCING IT, AND ROTOR FOR BRUSHLESS MOTOR

CROSS REFERENCE TO RELATED APPLICATION

This application is a National Stage of International Application No. PCT/JP2008/061423 filed Jun. 23, 2008, claiming priority based on Japanese Patent Application Nos. 2007-170538 and 2007-298547, filed Jun. 28, 2007 and Nov. 16, 2007 respectively, the contents of all of which are incorporated herein by reference in their entirety.

FIELD OF THE INVENTION

The present invention relates to a radially anisotropic ring R-TM-B magnet having at least one axial groove on the inner surface, its production method, a die for producing such a magnet, and a rotor for brushless motors using the radially anisotropic ring magnet.

BACKGROUND OF THE INVENTION

Permanent magnets of substantially R-TM-B are widely used because they are inexpensive and have high magnetic properties. Because R-TM-B magnets have excellent magnetic properties and high mechanical strength, and are less brittle, they can withstand internal stress due to sintering shrinkage. Accordingly, they can easily formed into radially anisotropic magnets and multi-polar-anisotropic ring magnets, resulting in motors with high power and small sizes.

When radially anisotropic ring magnets are used for rotors for brushless motors, ring magnets are fixed to rotor yokes mostly by adhesives or injection-molded resins. Because of recent demand for high quality and reliability for motors, etc., various proposals have been made to prevent the relative rotation of ring magnets and rotor yokes due to reduced bonding strength.

JP 10-201152 A discloses a permanent magnet rotor comprising a polar-anisotropic ring magnet retaining projections formed on the inner peripheral surface when sintered, and a rotor yoke having recesses at positions corresponding to the projections on the inner peripheral surface, the rotor yoke being inserted into the polar-anisotropic ring magnet such that the projections are aligned with the recesses, and their bonding strength being increased by a filling member. This reference describes that by utilizing projections and recesses without working as described above, the fixing strength of an annular permanent magnet to a rotor shaft can be increased. However, because the use of projections and recesses on the inner peripheral surface without working provides large unevenness in the inner diameter, there should be a large gap to some extent between the outer diameter of the rotor yoke inserted and the inner diameter of the magnet, so that the magnet cannot sufficiently exhibit magnetic properties.

JP 2005-304178 A discloses a technology for preventing the relative rotation of a ring magnet to a rotor yoke by grinding a sintering ring magnet to have a desired inner diameter with axial recesses on the inner surface at positions corresponding to magnetic poles, grinding a rotor yoke to have axial projections on the outer peripheral surface at positions corresponding to the recesses, and engaging the sintering ring magnet around the rotor yoke. JP 2005-304178 A describes that axial recesses can be formed by removing by grinding projections from a rough inner peripheral surface of the polar anisotropic ring magnet formed by anisotropic sintering shrinkage of magnet powder. Because projections are ground off from the inner peripheral surface of the magnet, a constant gap can be obtained between the rotor yoke and the inner surface of the magnet. However, because roughness caused by an oriented magnetic field in the polar-anisotropic magnet is utilized, only polar-anisotropic magnets can be used, but radially anisotropic magnets cannot be used.

Although the polar anisotropic ring magnets of JP 10-201152 A, JP 2005-304178 A, etc. have high peaks in surface magnetic flux density waveforms after magnetization, the waveforms being almost sinusoidal, magnet powder is oriented to achieve a final waveform pattern during molding, so that uneven powder supply tends to cause unevenness in magnetic properties because of problems in molding, such as the disturbance of a waveform, etc. Also, polar orientation necessitates a thick magnet. On the other hand, radially anisotropic magnets can have different waveform patterns depending on magnetization methods, increasing the degree of freedom of designing motors. Accordingly, they are used for various motors. Against this backdrop, inexpensive, radially anisotropic ring magnets that can be surely locked to rotors have been desired.

Rotors comprising radially anisotropic ring magnets are widely used for motors. However, because magnetization does not easily provide radially anisotropic ring magnets with sinusoidal surface magnetic flux density waveforms, resulting in trapezoidal waveforms (rapid change of magnetic flux densities at ends of magnetic poles), the radially anisotropic ring magnets tend to have poor cogging characteristics. Because large cogging torque generates noise and vibration in motors, the reduction of cogging torque is one of the important objects in designing motors.

JP 3-265102 A discloses a radially anisotropic ring magnet having one or more axial grooves on the inner or outer peripheral surface. It describes that grooves absorbs tensile stress and compression stress generated in a cooling process after sintering, thereby preventing cracking. It describes that grooves on the inner or outer peripheral surface are formed by a non-magnetic die having axial ridges. However, the method of JP 3-265102 A provides large difference in a magnetic flux density between the non-magnetic ridges and the magnet powder in a magnetic field during molding, resulting in disturbance in the orientation of the magnet powder near the grooves of the magnet, and thus deformation and cracking during sintering. When the magnet is used for a motor rotor, the motor has large cogging torque because of disturbance in a surface magnetic flux density waveform after magnetization.

JP 2005-79423 A discloses a die for producing a radially anisotropic ring magnet having roughness on the peripheral surface, the die having a cylindrical cavity defined by a ferromagnetic body, and a peripheral surface of the cylindrical cavity being provided with axial non-magnetic projections and recesses, thereby reducing disturbance in the orientation of magnet powder during molding. Because this die is designed based on a magnetic field orientation when there is no magnet powder in the cavity, there is large magnetic flux density difference between the non-magnetic projections and recesses and the magnet powder in an orientated magnetic field during molding. Accordingly, there is large disturbance in the orientation of magnet powder near the recesses particularly in the case of a short roughness period, resulting in deformation and cracking during sintering. When a ring magnet with largely disturbed orientation of magnet powder is used for a motor rotor, there is disturbance in a surface magnetic flux density waveform after magnetization, resulting in large cogging torque.

To suppress sintering deformation in anisotropy sintering magnets to improve their magnetic properties, JP 9-45568 A discloses a compression-molding method in a magnetic field using a die comprising a member having saturation magnetization $4\pi Is$ of 0.5-1.2 T on at least a cavity-facing surface. However, the method of JP 9-45568 A molds magnets with flat surfaces such as rectangular solids, failing to disclose a technology for providing radially oriented ring magnets with partial roughness on the inner peripheral surfaces, such that deformation is suppressed near the roughness. In addition, it does not describe a magnetic die member having $4\pi Is$ of more than 1.2 T.

OBJECT OF THE INVENTION

Accordingly, an object of the present invention is to provide a radially anisotropic ring magnet for immovably attached to a rotor for a brushless motor without deteriorating cogging torque, thereby surely avoiding free rotation relative to the rotor, its production method, a die for producing such a radially anisotropic ring magnet, and a rotor for brushless motor using the radially anisotropic ring magnet.

DISCLOSURE OF THE INVENTION

As a result of intensive research in view of the above objects, the inventors have found that (1) by disposing a magnetic core sleeve having axial ridges around a cylindrical, magnetic core in a die for compression-molding a green body to a radially anisotropic ring magnet in a magnetic field, and (2) by magnetizing the ring magnet such that centerlines between magnetic poles do not overlap grooves on the inner surface, the relative rotation of the radially anisotropic ring magnet to the rotor during operation can be surely prevented without increasing cogging torque. The present invention has been completed based on such finding.

Thus, the method of the present invention for producing a radially anisotropic ring magnet having at least one axial groove on the inner surface comprises using a die comprising a cylindrical, magnetic core, a magnetic core sleeve having an axial ridge in alignment with the groove on the outer surface and disposed around the magnetic core, and an outer, cylindrical, magnetic die member defining a cavity for forming the radially anisotropic ring magnet with the magnetic core sleeve, and compression-molding magnet powder charged into the cavity while applying a magnetic field in a radial direction.

A magnetic flux density A in the magnetic core sleeve and a magnetic flux density B in the magnet powder in a magnetic field applied during the compression molding preferably meet the relation of $0.65 \le A/B \le 1.2$.

The magnetic core and the outer, magnetic die member preferably have $4\pi Is$ of more than 1.7 T.

The radially anisotropic ring magnet is preferably substantially composed of R-TM-B, wherein R is at least one of rare earth elements including Y, TM is at least one of transition metals, and B is boron.

The method preferably further comprises the step of machining other portions than the groove on the inner surface of the radially anisotropic ring magnet to a predetermined inner diameter.

The radially anisotropic ring magnet of the present invention is substantially composed of R-TM-B, wherein R is at least one of rare earth elements including Y, TM is at least one of transition metals, and B is boron, has at least one axial groove on the inner surface, and is magnetized such that the groove does not overlap centerlines between magnetic poles.

The radially anisotropic ring magnet of the present invention is preferably produced by the above method. The radially anisotropic ring magnet of the present invention is preferably magnetized such that the groove does not overlap centerlines between magnetic poles.

The rotor of the present invention for a brushless motor comprises the radially anisotropic ring magnet, and a rotor yoke having an axial ridge in alignment with at least one groove of the radially anisotropic ring magnet, both concentrically fixed to each other.

The die of the present invention for the production of a radially anisotropic ring magnet having at least one axial groove on the inner surface comprises a cylindrical, magnetic core, a magnetic core sleeve disposed around the magnetic core, and an outer, cylindrical, magnetic die member for defining a cavity for forming the radially anisotropic ring magnet with the magnetic core sleeve, the magnetic core sleeve having an axial ridge in alignment with the groove on the outer surface.

DESCRIPTION OF THE PREFERRED EMBODIMENTS

Referring to an R-TM-B magnet as the radially anisotropic ring magnet, the present invention will be explained in detail.

The radially anisotropic ring magnet is preferably composed substantially of R-TM-B. R is at least one of rare earth elements including Y, preferably containing Nd or Pr. TM is at least one transition metal, preferably Fe.

The radially anisotropic ring magnet preferably has a composition comprising 24-34% by mass of R, and 0.6-1.8% by mass of B, the balance being Fe. When R is less than 24% by mass, the radially anisotropic ring magnet has low residual magnetic flux density Br and coercivity iHc. When R exceeds 34% by mass, a rare-earth-element-rich phase occupies a high percentage of the sintered body, and becomes coarse, resulting in reduced corrosion resistance. When B is less than 0.6% by mass, the amount of B necessary for the formation of an $R_2Fe_{14}B$ phase, a main phase, is insufficient, thereby forming a soft-magnetic $R_2Fe_{17}$ phase and thus resulting in reduced coercivity. When B exceeds 1.8% by mass, a non-magnetic, B-rich phase increases, resulting in a reduced residual magnetic flux density Br. Part of Fe (50% by mass or less) may be substituted by Co, and elements such as Al, Si, Cu, Ga, Nb, Mo, W, etc. may be contained in an amount of 3% or less by mass based on Fe.

Pulverization comprises coarse pulverization and fine pulverization. The coarse pulverization is preferably conducted by a stamp mill, a jaw crusher, a Brown mill, a disc mill, etc. or a hydrogen adsorption method. The fine pulverization is preferably conducted by a jet mill, a vibration mill, a ball mill, etc. Any of them is preferably conducted in a non-oxidizing atmosphere using an organic solvent or an inert gas to prevent oxidation. The size of pulverized particles is preferably 2-8 μm (F.S.S.S.). When it is less than 2 μm, magnet powder has high activity, causing vigorous oxidation, which leads to large sintering deformation and poor magnetic properties. When it is more than 8 μm, the sintered body has a large crystal grain size, suffering easy magnetization reversal and reduced coercivity.

Figure 17A:
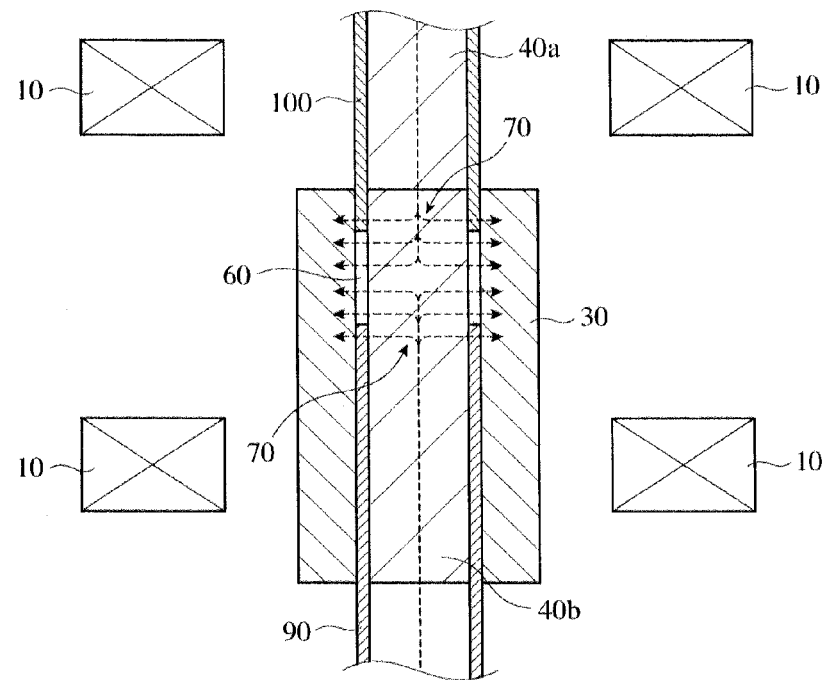
FIG. 17(a) is a schematic cross-sectional view showing one example of apparatuses for molding radially anisotropic ring magnets.
Figure 17B:
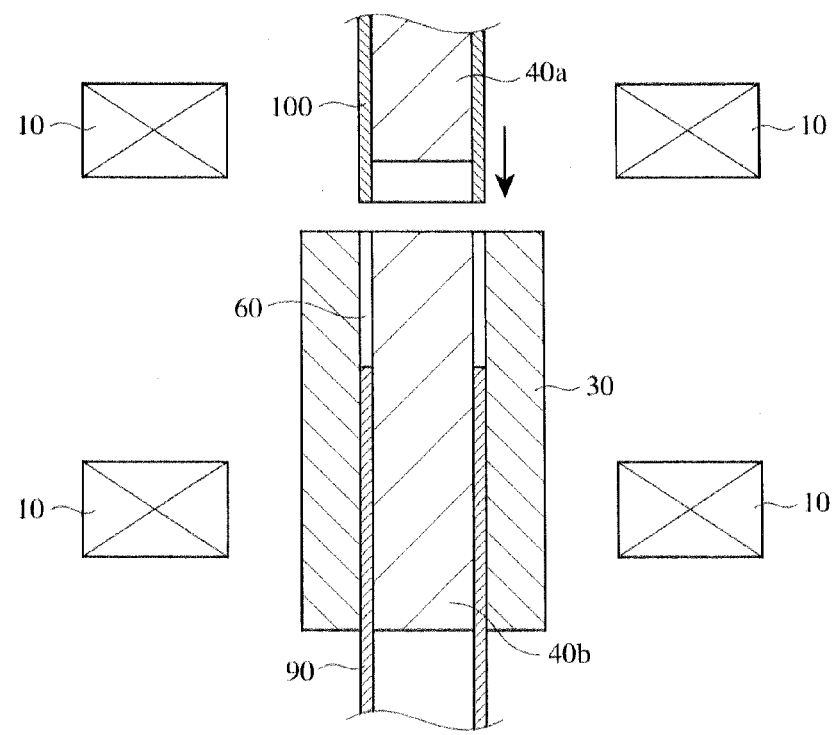
FIG. 17(b) is a schematic cross-sectional view showing another example of apparatuses for molding radially anisotropic ring magnets.

The molding of a radially anisotropic ring magnet is conducted, for instance, by the molding apparatus shown in FIG. 17(a). The die comprises upper and lower cylindrical cores 40a, 40b, an outer, cylindrical die member 30, a lower, cylindrical punch 90, and an upper, cylindrical punch 100, a space defined by these parts constituting a cavity 60. The core is constituted by an upper core 40a and a lower core 40b, the upper core 40a being detachable from the lower core 40b as shown in FIG. 17(b), and the upper punch 100 being detachable from the cavity 60. The upper core 40a and the upper punch 100 are independently movable up and down. A pair of magnetic-field-generating coils 10 are disposed at upper and lower positions around the upper and lower cores 40a, 40b, such that a magnetic force 70 is applied to the cavity 60 through the upper and lower cores 40a, 40b, which are closed to each other.

The intensity of an orienting magnetic field for the radially anisotropic ring magnet is limited by the amount of a magnetic flux capable of flowing through the core. Accordingly, when small-diameter magnets are produced, namely when the core has a small cross section area, the core should be made of materials having high saturation magnetization, which permits more magnetic flux to flow per a unit area. Large-diameter magnets do not suffer this limitation, but proper cores can be selected depending on the shapes, sizes and characteristics of magnets. For the same reasons, materials for the outer die member should have higher saturation magnetization as their diameters become smaller.

The intensity of a radial magnetic field applied to the cavity 60 to orient magnet powder is preferably 159 kA/m or more, more preferably 239 kA/m or more. When the intensity of the orienting magnetic field is less than 159 kA/m, the magnet powder is not fully oriented, failing to obtain good magnetic properties. The intensity of a magnetic field is measured in a radial center portion of the cavity. The molding pressure is preferably 0.5-2 ton/cm². When it is less than 0.5 ton/cm², the resultant green bodies have such low strength that they are easily broken. When it is more than 2 ton/cm², the magnet powder is not well oriented, resulting in low magnetic properties.

Figure 1:
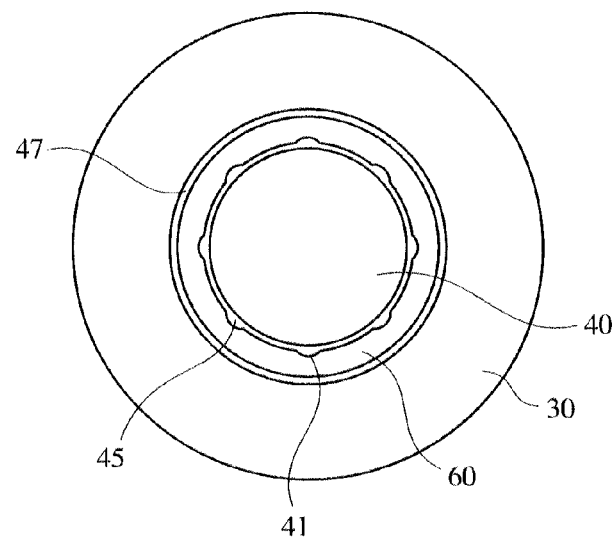
FIG. 1 is a cross-sectional view showing one example of dies for molding a ring magnet having grooves on the inner surface.
Figure 2:
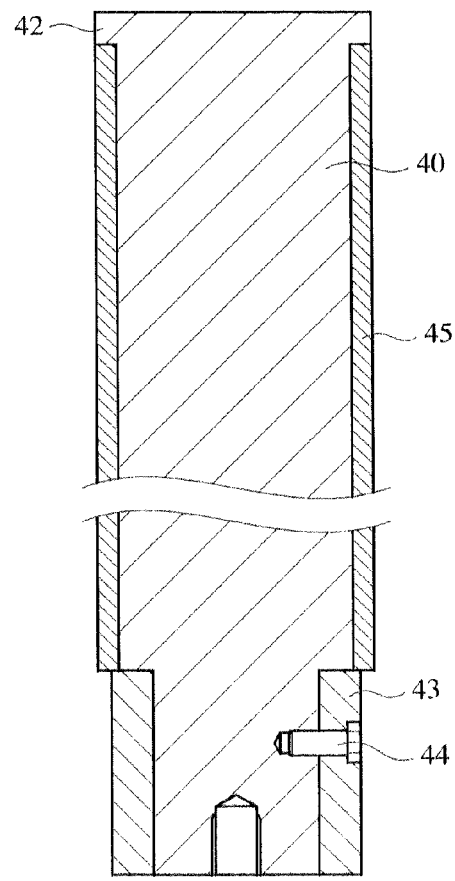
FIG. 2 is a vertical cross-sectional view showing one example of cylindrical cores having a sleeve on the periphery.

FIG. 1 shows one example of dies for compression-molding a ring magnet having grooves on the inner surface in a magnetic field. The die comprises a cylindrical core 40, a core sleeve 45 having axial ridges 41 and disposed around an outer peripheral surface of the core 40, an outer, cylindrical die member 30 for defining a cavity 60 with the core 40, and an outer die sleeve 47 disposed inside an inner surface of the outer die member 30. The axial direction is a direction in parallel to a center axis of the cylindrical core sleeve, which is perpendicular to the paper of FIG. 1. As shown in FIG. 2, the core sleeve 45 is fixed to an outer peripheral surface of the core 40 by an upper projection 42 of the core and an annular stopper 43 fixed with a screw 44 to a lower portion of the core, and bonded to the core with an adhesive. Molding by this die provides a ring magnet having grooves on the inner surface. In the present invention, the core 40, the core sleeve 45 and the outer die member 30 are made of magnetic materials.

In a magnetic field applied during molding, a magnetic flux density A in the core sleeve and a magnetic flux density B in the magnet powder to be molded preferably meet 0.65≤A/B≤1.2. When the core sleeve is made of a non-magnetic material, a magnetic flux density in the core sleeve when a magnetic field is applied can be considered to be substantially equal to that in vacuum, lower than when the core sleeve is made of a magnetic material. When A/B is less than 0.65, namely when the core sleeve has a small magnetic flux density close to that in a non-magnetic body, there is large disturbance in magnet powder during molding. When A/B is more than 1.2, namely when the core sleeve has a large magnetic flux density, there is large magnetic flux density difference between the sleeve and the magnet powder, resulting in large disturbance in magnet powder during molding. A/B meets more preferably 0.8≤A/B≤1.2, most preferably 0.9≤A/B≤1.15.

By controlling the magnetic properties of the magnetic core sleeve as described above, the density of a magnetic flux radially expanding from the cylindrical, magnetic core having high saturation magnetization 4πIs and passing through the magnetic core sleeve can be reduced to the same level as that of a magnetic flux passing through magnet powder. As a result, disturbance in the orientation of magnet powder can be suppressed near ridges of the die core sleeve.

The cylindrical, magnetic core may be surrounded by the magnetic sleeve having axial ridges directly or via a sleeve made of a material having intermediate magnetic properties (magnetic flux density in a magnetic field applied during compression molding) between those of the cylindrical, magnetic core and the magnetic sleeve. With such structure, the density of a magnetic flux radially expanding from the core can be smoothly decreased when entering the sleeve, to the same level as in the magnet powder being molded in a magnetic field.

The core sleeve is preferably made of a material having excellent wear resistance, specifically cemented carbide (alloy comprising carbide of at least one metal selected from the group consisting of Ti, Zr, Hf, V, Nb, Ta, Cr, Mo and W, and a metal such as Fe, Ni, Co, etc.). The cemented carbide has magnetic properties changeable depending on compositions and production methods. For instance, WC—Co cemented carbide has saturation magnetization changeable depending on the amount of Co. Materials for the core sleeve have a magnetic flux density of preferably 0.6-1 T, more preferably 0.8-1 T, for instance, in a magnetic field of 318 kA/m. When the magnetic flux density in the core sleeve is less than 0.6 T, it is too small, close to that in a non-magnetic body, resulting in large disturbance of magnet powder during molding. When the magnetic flux density in the core sleeve is more than 1 T, it is too large relative to that in the magnet powder, resulting in large disturbance of magnet powder during molding.

Because the outer die sleeve is extremely less affected by a magnetic field than the core sleeve, the sleeve may be magnetic or non-magnetic. During molding, a magnetic flux density C in the outer die sleeve and a magnetic flux density B in the magnet powder preferably meet the relation of C/B≤1.2. Accordingly, to prevent friction wear with the magnet powder during molding, materials for the outer die sleeve may properly be determined taking into consideration problems in mass production such as wear resistance, etc. The thickness of the outer die sleeve may properly be determined such that the outer die sleeve is wear-resistant without suffering decrease in a magnetic flux density.

Sintering is conducted preferably at 1000-1150° C. in vacuum or in an argon atmosphere. Lower than 1000° C. results in insufficient sintering, failing to obtain a necessary density and thus resulting in low magnetic properties. Higher than 1150° C. provides excess sintering, resulting in deformation and low magnetic properties. The green body is sintered preferably in a constrained state, particularly with a cylindrical body inserted into the ring. The sintering of the green body in a constrained state provides a radially anisotropic ring magnet with improved roundness.

Placed on a Mo plate in a Mo-made, heat-resistant container, the green body is sintered. When the Mo plate is a rolled sheet having small surface roughness, the green body tends to stick to the Mo plate while sintering, and the resultant radially anisotropic ring magnet is deformed by sintering shrinkage, resulting in low roundness, because of large friction resistance between the Mo plate and a lower part (contact surface) of the green body for a radially anisotropic ring magnet. To prevent the green body from sticking to the Mo plate while sintering, the Mo plate is preferably provided with surface roughness increased by machining, etc., such that it has a reduced contact area with the green body. The machining is preferably blasting. The surface roughness Rmax (JISR6001-1983) of the blasted Mo plate is preferably 5-100 μm, more preferably 7-50 μm, most preferably 10-30 μm. With Rmax of less than 5 μm, sticking easily occurs between the green body and the Mo plate while sintering, resulting in a deformed magnet. With Rmax of more than 100 μm, the green body is constrained by the Mo plate during a shrinking process, resulting in a deformed sintered body.

After sintering, the sintered body is preferably heat-treated. The heat treatment may be conducted before or after machining described later.

The outer, inner and end surfaces of the sintered body are preferably machined to necessary sizes, if necessary. Machining can be conducted by using proper known apparatuses such as an outer-surface grinding machine, an inner-surface grinding machine, a plane-grinding machine, etc. Surface treatments such as plating, coating, the vacuum vapor deposition of aluminum, a chemical conversion treatment, etc. may be conducted, if necessary.

A rotor yoke is inserted into the radially anisotropic ring magnet having grooves on the inner surface, and bonded thereto with an adhesive to produce a rotor for brushless motor. The rotor yoke is provided with axial ridges on the outer peripheral surface at one or more positions correspondingly to the grooves of the ring magnet.

Figure 3:
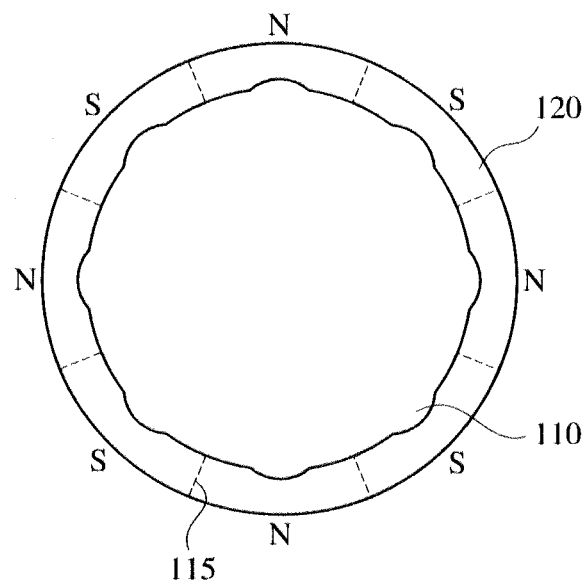
FIG. 3 is a transverse cross-sectional view showing magnetization in which centers of the grooves are aligned with centers of the magnetic poles.
Figure 4:
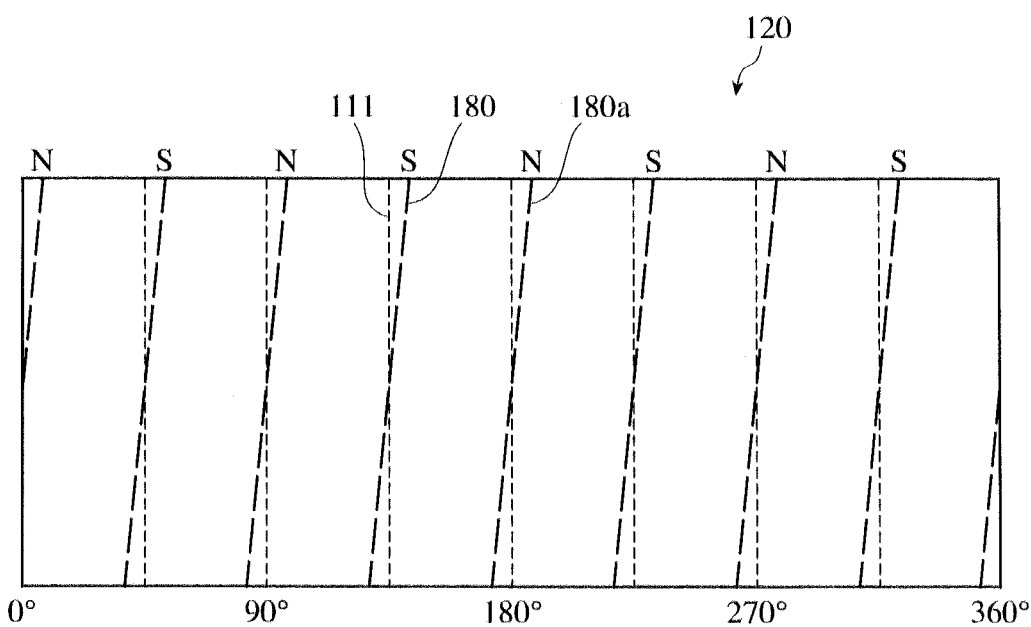
FIG. 4 is a circumferential development showing the skew magnetization of the radially anisotropic ring magnet of FIG. 3.
Figure 5:
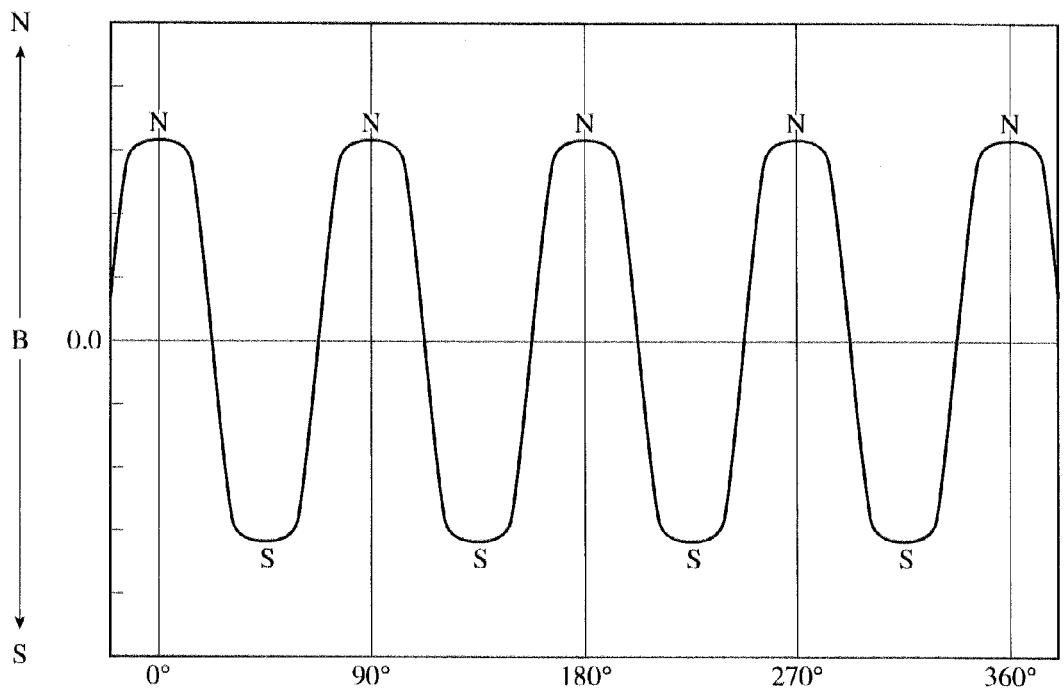
FIG. 5 is a graph showing a magnetic flux density on a surface of the radially anisotropic ring magnet of FIG. 3 after circumferentially magnetized.
Figure 18:
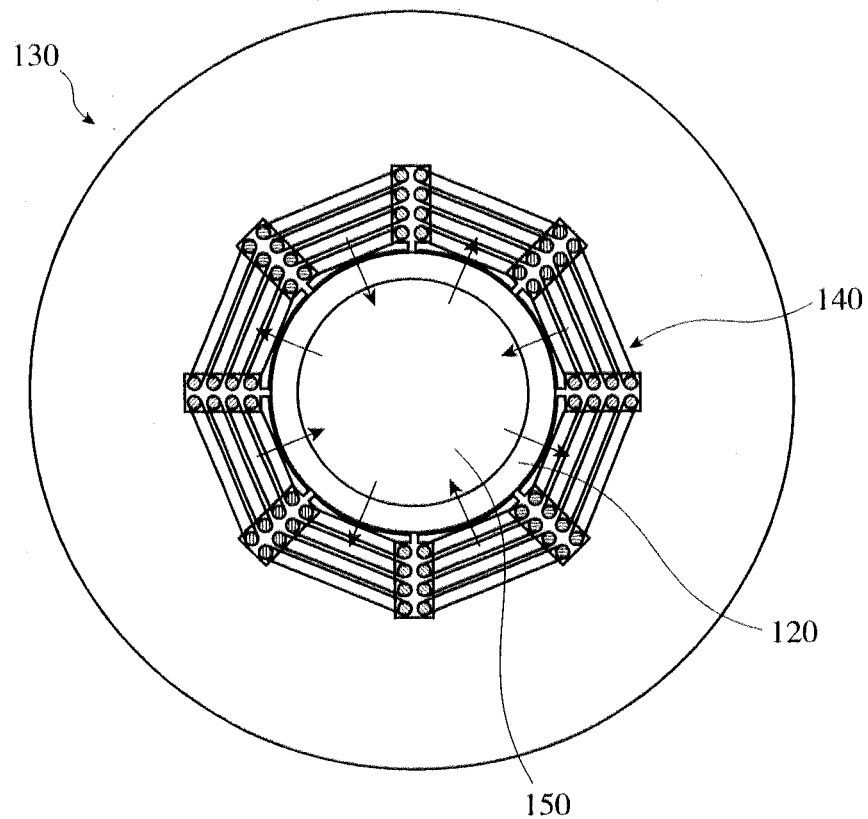
FIG. 18 is a plan view showing a magnetizing yoke.

Using a magnetizing yoke 130 comprising a coil 140, for instance, shown in FIG. 18, in which the arrows indicate the directions of magnetic fields applied for magnetization, the radially anisotropic ring magnet 120 fixed to the rotor yoke 150 for a brushless motor is preferably magnetized with such a skew angle that centerlines 115 between magnetic poles do not overlap the grooves 110 as shown in FIGS. 3 and 4. Magnetization is conducted further preferably such that centerlines 180 of magnetic poles cross at least partially centerlines 111 of the grooves 110 on the inner surface of the ring magnet. The centerlines 115 between magnetic poles (not shown in FIG. 4) are parallel lines equally distant from centerlines 180,180a of adjacent magnetic poles in FIG. 4. The centerlines 115 between magnetic poles are substantially axial lines connecting points, at which the surface magnetic flux density of the ring magnet is zero, namely at which B=0 in the graph of FIG. 5 showing a circumferential surface magnetic flux density distribution.

The magnetization conditions may be properly selected depending on the material and size of the radially anisotropic ring magnet, and in the case of radially anisotropic ring magnets in Examples described later, they are preferably capacitance of 1000-2000 μF, charging voltage of 1000-2500 V and magnetization current of 8-25 kA. With the magnetization current of less than 8 kA, the desired characteristics cannot be obtained after magnetization. Even with magnetization at more than 25 kA, the improved magnetic properties are not obtained.

Figure 13:
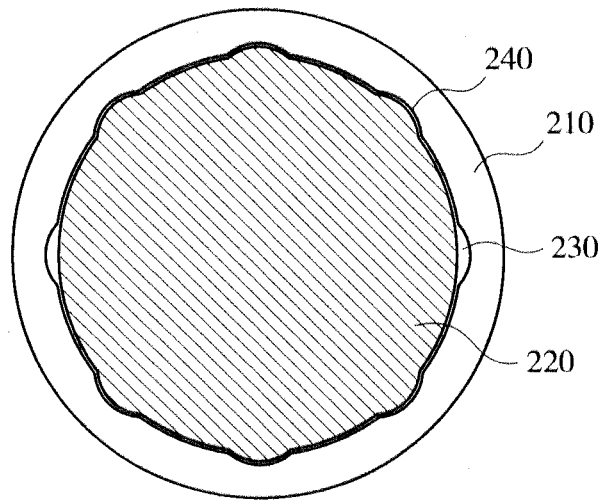
FIG. 13 is a cross-sectional view showing a rotor yoke having six axial ridges on the outer surface, which is fitted in a ring magnet having eight grooves on the inner surface.
Figure 14:
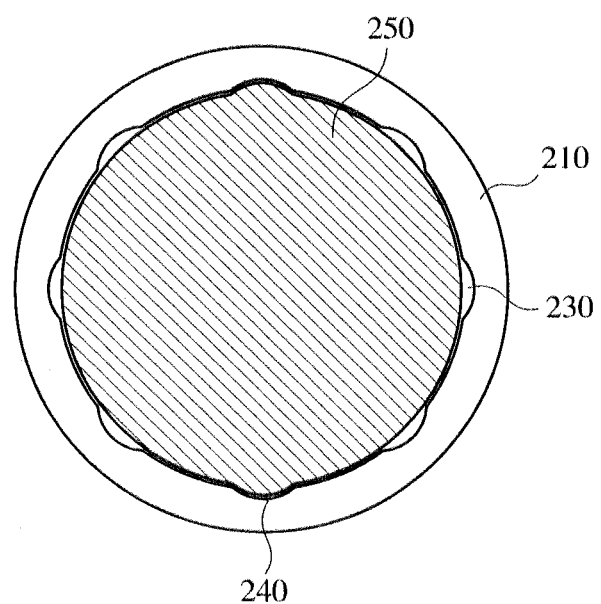
FIG. 14 is a cross-sectional view showing a rotor yoke having two axial ridges on the outer surface, which is fitted in a ring magnet having eight grooves on the inner surface.

The rotor yoke is provided with axial ridges on the outer surface correspondingly to grooves on the inner surface of the magnet to prevent the relative rotation of the rotor yoke to the magnet. The number of axial ridges need not be the same as that of grooves, and at least one axial ridge would provide enough effect of preventing the relative rotation. For instance, when a rotor yoke 220 having six axial ridges is inserted into a radially anisotropic ring magnet 210 having eight grooves as shown in FIG. 13, the axial ridges engage the magnet grooves in six portions 240, with two gaps 230 between the rotor yoke and the magnet grooves. Although the gaps 230 do not prevent the relative rotation of the magnet to the rotor yoke, the six portions 240 in which the axial ridges engage the magnet grooves have sufficient effect of preventing their relative rotation. As shown in FIG. 14, a sufficient relative-rotation-preventing effect can be obtained by two portions 240 in which the axial ridges engage magnet grooves.

The number of grooves on the inner surface of the magnet is preferably smaller than the number of axial ridges on the outer surface of the rotor yoke. If there is large friction resistance between a bottom of a green body for a radially anisotropic ring magnet and a Mo plate in a heat-resistant container during sintering, part of the sintered body may be deformed, failing to achieve good engagement of grooves on the inner surface of the magnet with ridges on the outer surface of the rotor yoke. With fewer ridges on the outer surface of the rotor yoke than grooves on the inner surface of the magnet, deformation-free grooves on the inner surface of the magnet may be utilized for engagement with ridges, thereby avoiding inefficiency such as decrease in yield, re-working of the ring magnet or the rotor yoke, etc.

Figure 15:
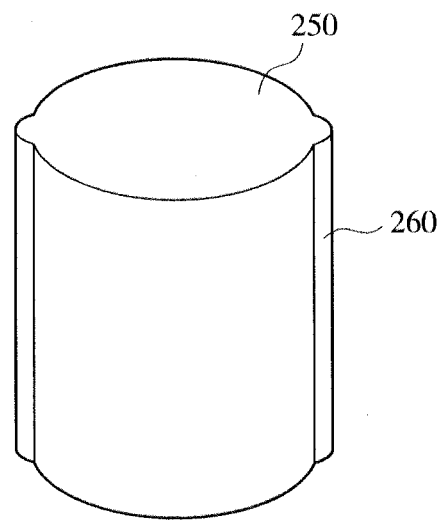
FIG. 15 is a perspective view showing a rotor yoke having two axial ridges having the same length as that of the rotor yoke.
Figure 16:
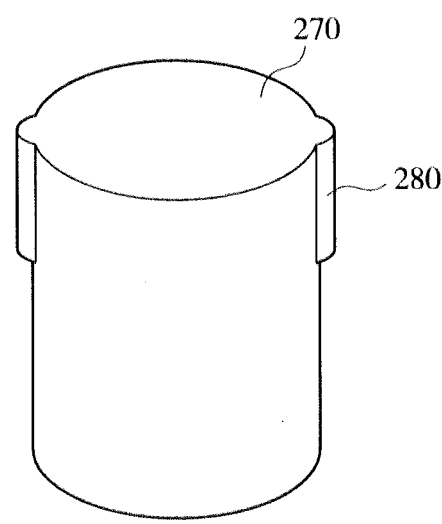
FIG. 16 is a perspective view showing a rotor yoke having two axial ridges shorter than the rotor yoke.

The axial ridges may be as long as the magnet longitudinally as shown in FIG. 15 though not restricted, and they may have such length as to prevent the relative rotation of the magnet to the rotor yoke as shown in FIG. 16.

The rotor yoke may be constituted by laminated electromagnetic steel plates. Though a rotor yoke shaft is omitted in the figures, it may be used properly depending on the size and applications of a motor to be produced.

Example 1

Production of Sintered Body 101 (Example within the Present Invention)

Using a molding apparatus shown in FIGS. 17(*a*) and 17(*b*), which comprised a die comprising an outer die member 30 made of SK3, an outer die sleeve 47 made of non-magnetic cemented carbide, a core 40 made of Permendur, and a core sleeve 45 made of cemented carbide (FUJILLOY D40 available from Fuji Die Co., Ltd.), compression molding was conducted in a magnetic field of 318 kA/m to produce a green body for a radially anisotropic R-TM-B ring magnet comprising 23.6% by mass of Nd, 2.2% by mass of Dy, 6.6% by mass of Pr, and 1% by mass of B, the balance being Fe and inevitable impurities, and having eight grooves uniformly on the inner surface. The core sleeve 45 having axial ridges 42 was coaxial with the circular core 40. The outer die sleeve 47 was disposed on the inner surface of the outer die member 30. In a magnetic field during molding, a magnetic flux density ratio A/B of the core sleeve to the R-T-B magnet powder was 0.7. Placed on a Mo plate in a Mo-made container, the ring-shaped green body with the cylindrical body still inserted was sintered. Thereafter, the sintered ring magnet was heat-treated.

Production of Sintered Body 102 (Example within the Present Invention)

A radially anisotropic, sintered ring magnet was produced by the same method as producing the sintered body 101, except for using a die comprising a core sleeve 45 made of FUJILLOY D40 (cemented carbide) and an outer die sleeve 47 made of FUJILLOY D40 (cemented carbide). In a magnetic field during molding, a magnetic flux density ratio A/B of the core sleeve to the R-T-B magnet powder was 0.7.

Production of Sintered Body 103 (Example within the Present Invention)

A radially anisotropic, sintered ring magnet was produced by the same method as producing the sintered body 101, except for using a die comprising a core sleeve 45 made of cemented carbide (FUJILLOY D60 available from Fuji Die Co., Ltd.). In a magnetic field during molding, a magnetic flux density ratio A/B of the core sleeve to the R-T-B magnet powder was 1.1.

Production of Sintered Body 104 (Example within the Present Invention)

A radially anisotropic, sintered ring magnet was produced by the same method as producing the sintered body 101, except for using a die comprising a core sleeve 45 made of FUJILLOY D60 (cemented carbide) and an outer die sleeve 47 made of FUJILLOY D60 (cemented carbide). In a magnetic field during molding, a magnetic flux density ratio A/B of the core sleeve to the R-T-B magnet powder was 1.1.

Production of Sintered Body 105 (Comparative Example)

Figure 6:
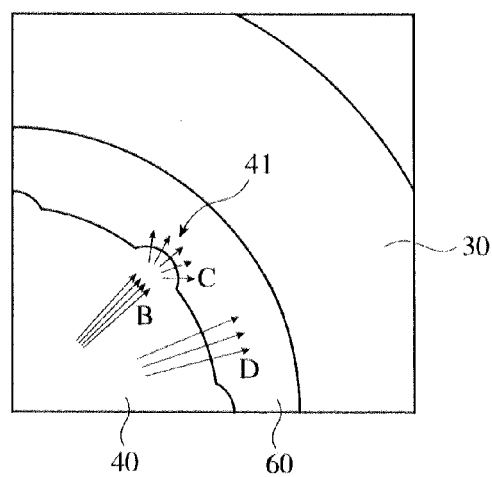
FIG. 6 is an enlarged cross-sectional view showing a die without a core sleeve for the production of a sintered body 105 (Comparative Example).

A radially anisotropic, sintered ring magnet was produced by the same method as producing the sintered body 101, except for using a die comprising a Permendur-made core 40 having axial ridges 41 without a core sleeve as shown in FIG. 6. In a magnetic field during molding, a magnetic flux density ratio A/B of the core to the R-T-B magnet powder was 2.4. Used as the value of A was the saturation magnetic flux density $4\pi Is$ of Permendur (=2.2 T).

Production of Sintered Body 106 (Comparative Example)

A radially anisotropic, sintered ring magnet was produced by the same method as producing the sintered body 101, except for using a core sleeve 45 made of non-magnetic cemented carbide. In a magnetic field during molding, a magnetic flux density ratio A/B of the core sleeve to the R-T-B magnet powder was 0.4. Used for the magnetic flux density of the non-magnetic core sleeve in a magnetic field of 318 kA/m was A=0.4 T, which was calculated assuming that the non-magnetic body had permeability equal to that of vacuum.

The magnetic properties of materials used for the die in Example 1 are shown in Table 1. The magnetic flux density of D40 was parallel to a magnetic field intensity in a range shown in Table 1, 0.4 T in a magnetic field of 159 kA/m and 0.6 T in a magnetic field of 318 kA/m. In D60, G7 and R-TM-B magnet powder, too, the magnetic field intensity and the magnetic flux density are in a parallel relation in the range shown in Table.

The degree of deformation of outer surfaces of the sintered bodies 101-106 was evaluated by the values obtained by dividing the roundness (JIS B0621) of the outer diameter by the diameter of the magnet. The structure of a die used for molding in a magnetic field in Example 1, and the degree of deformation of outer surfaces of the sintered bodies are shown in Table 2.

TABLE 1

| Materials | Magnetic Field (kA/m) | Magnetic Flux Density (T) |
|---|---|---|
| Permendur[1] | ≥48 | ≥2 |
| SK3[2] | ≥40 | ≥1.7 |
| D40[3] | 159-318 | 0.4-0.6 |
| D60[3] | 159-318 | 0.7-1.0 |
| G7[3] | 159-318 | 0.65-0.9 |

TABLE 1-continued

| Materials | Magnetic Field (kA/m) | Magnetic Flux Density (T) |
|---|---|---|
| R-TM-B Magnet Powder[3] | 159-318 | 0.5-0.9 |

Note:
[1]Permendur had saturation magnetization $4\pi Is$ of 2.2 T.
[2]SK3 had saturation magnetization $4\pi Is$ of 1.77 T.
[3]In D40, D60, G7 and R-TM-B magnet powder, the magnetic field intensity and the magnetic flux density were in a parallel relation in the range shown in Table.

TABLE 2

| Sintered Body | Die | | | | Roundness/ Magnet Diameter |
|---|---|---|---|---|---|
| | Core | Core Sleeve | Outer Die Sleeve | Outer Die Part | |
| 101* | Permendur | D40 | Non-magnetic cemented carbide | SK3 | 0.010 |
| 102* | Permendur | D40 | D40 | SK3 | 0.010 |
| 103* | Permendur | D60 | Non-magnetic cemented carbide | SK3 | 0.010 |
| 104* | Permendur | D60 | D60 | SK3 | 0.010 |
| 105** | Permendur | None | Non-magnetic cemented carbide | SK3 | 0.033 |
| 106** | Permendur | Non-magnetic cemented carbide | Non-magnetic cemented carbide | SK3 | 0.017 |

Note:
*indicates Examples within the present invention, and **indicates Comparative Examples.

In the sintered body 105 (Comparative Example), slight deformation was observed after sintering and heat treatment at positions on the outer surface corresponding to grooves on the inner surface. It is considered that this deformation occurred due to the difference in magnetic flux density between the die core and the magnet powder during molding in a magnetic field. Because Permendur forming the core has a higher magnetic flux density than that of the magnet powder in the cavity as shown in Table 1, a magnetic flux generated by a magnetic field applied during molding and radially expanding from the core center tends to expand perpendicularly to an outer peripheral surface of the core at an interface between the core 40 and the cavity 60 as shown in FIG. 6. Accordingly, a magnetic flux D radially expands in other portions than the ridges 41, while a radial magnetic flux B expands as shown by C in the ridges 41, disturbing the orientation of the magnet powder. It is thus considered that the sintered ring magnet is deformed at outer surface positions corresponding to the grooves on the inner surface.

Because the sintered body 106 (Comparative Example) was produced using the core sleeve 45 having axial ridges, which was made of non-magnetic cemented carbide, there was difference in magnetic flux density between the core sleeve and the magnet powder shown in Table 1. A magnetic flux thus proceeds perpendicularly to an interface from the core sleeve to the magnet powder. Accordingly, a magnetic flux radially expanding from the core expands as in the sintered body 105 (Comparative Example) at the ridges of the core sleeve when going from the core sleeve to the magnet powder, thereby disturbing the orientation of the magnet powder. It is thus considered that the sintered ring magnet was deformed at outer surface positions corresponding to the grooves on the inner surface.

Figure 7:
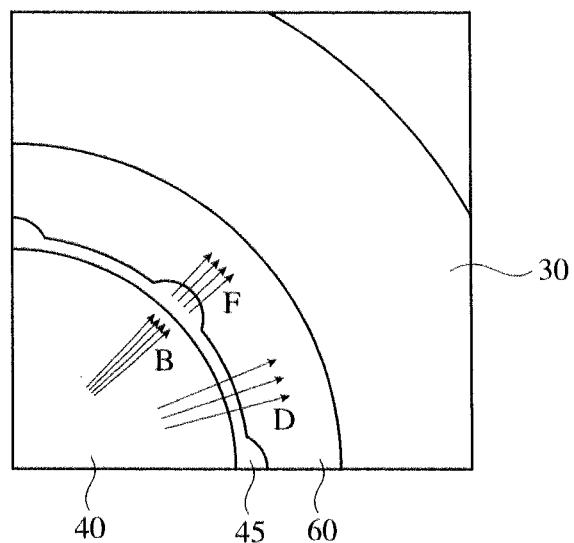
FIG. 7 is an enlarged cross-sectional view showing a die without a core sleeve for the production of a sintered body 101 (Example within the present invention).
Figure 8:
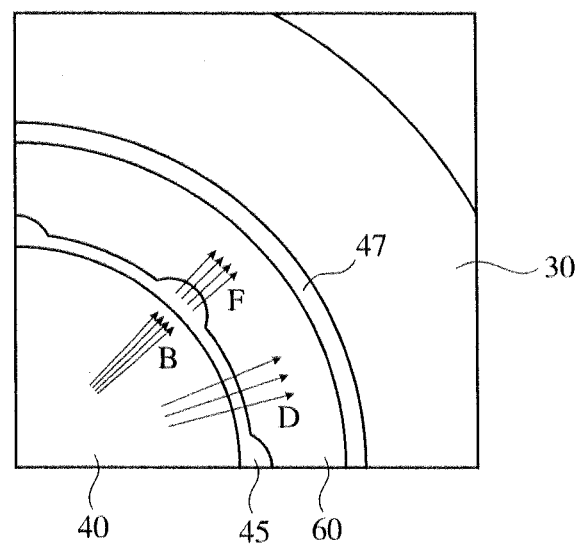
FIG. 8 is an enlarged cross-sectional view showing a die without a core sleeve and an outer die sleeve for the production of a sintered body 102 (Example within the present invention).

On the other hand, the sintered body 101 (Example within the present invention) and the sintered body 103 (Example within the present invention) were produced with the magnetic core sleeve 45 made of D40 or D60 and having axial ridges disposed on the outer surface of the core 40. It is thus considered that as shown in Table 1, the core sleeve 45 had a magnetic flux density close to that in the magnet powder in the cavity 60, a magnetic flux B expanding from the core center did not change its course at the sleeve ridges 41 as shown in FIG. 7, so that it radially expanded as shown by F like the magnetic flux D. In the case of the sintered body 102 (Example within the present invention) and the sintered body 104 (Example within the present invention) produced with a sleeve made of the same material as that of the outer die member, which was disposed on the inner surface of the outer die member, a magnetic flux was little deflected as shown by F in FIG. 8, causing no disturbance in the orientation of the magnet powder even near the ridges 41. As a result, the sintered bodies were neither deformed nor cracked at outer surface positions corresponding to the grooves on the inner surface.

Figure 19:
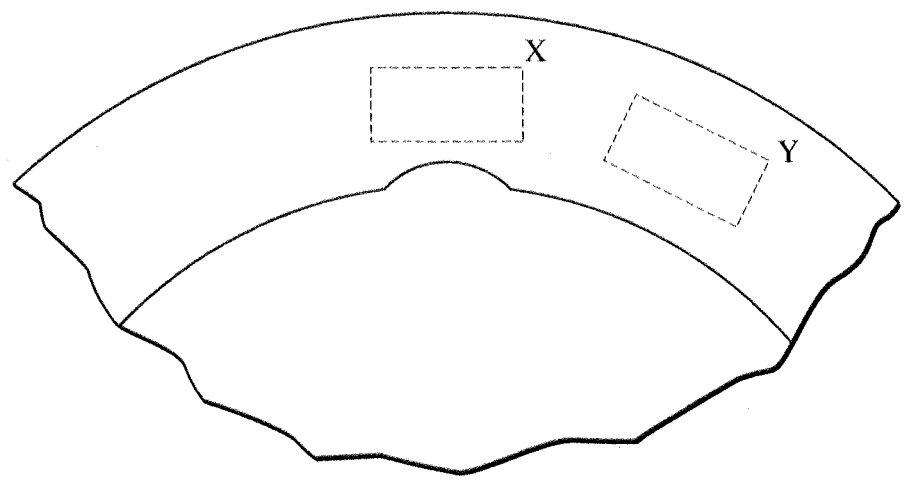
FIG. 19 is a schematic view showing the positions of cutting out test pieces for measuring BH characteristics in Example 1.

With respect to the resultant radially anisotropic, sintered ring magnets 101 and 105 (Example within the present invention and Comparative Example), cubic samples were cut out in a portion X near the groove and in a portion Y not close to the groove as shown in FIG. 19, to measure their BH characteristics. As a result, the sintered body 101 (Example within the present invention) showed no difference in magnetic properties (residual magnetic flux density) between the portion X near the groove and the portion Y not close to the groove. On the other hand, the sintered body 105 (Comparative Example) showed a residual magnetic flux density about several percentages lower in the portion X near the groove than in the portion Y not close to the groove.

Production of Radially Anisotropic Ring Magnets

Figure 9:
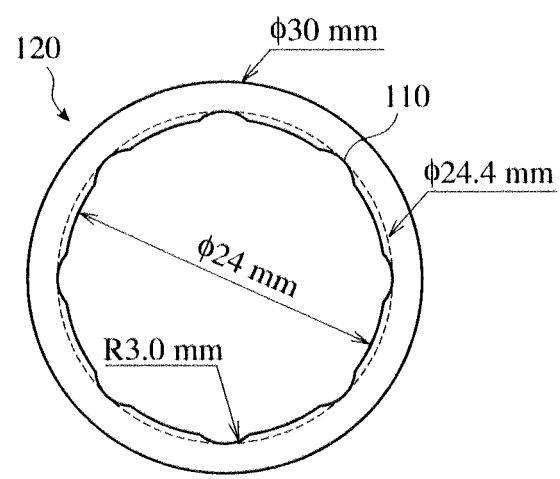
FIG. 9 is a transverse cross-sectional view showing a radially anisotropic ring magnet 101-106 having eight grooves on the inner surface.

The outer, inner and end surfaces of the sintered ring magnets 101-106 were ground to produce radially anisotropic ring magnets 101-106 each having an outer diameter of 30 mm, an inner diameter of 24.0 mm and a height of 40 mm, with grooves on the inner surface each having a depth of 0.2 mm and R of 3.0 mm, as shown in FIG. 9.

Example 2

Production of Sintered Body 201 (Example within the Present Invention)

Using a molding apparatus shown in FIGS. 17(a) and 17(b), which comprised a die comprising an outer die member 30 made of SK3, an outer die sleeve 47 made of non-magnetic cemented carbide, a core 40 made of Permendur, and a core sleeve 45 made of cemented carbide (EVERLOY G7 available from Kyoritsu Gokin Co., Ltd.) as shown in FIG. 1, compression molding was conducted in a magnetic field of 318 kA/m to produce a green body for a radially anisotropic ring R-TM-B magnet uniformly having eight grooves on the inner surface, which comprised 23.6% by mass of Nd, 2.2% by mass of Dy, 6.6% by mass of Pr, 1% by mass of B, and 2% by mass of Co, the balance being Fe and inevitable impurities. The core sleeve 45 coaxial with the circular core 40 had axial ridges. The outer die sleeve 47 was disposed on the inner surface of the outer die member 30. In a magnetic field during molding, a magnetic flux density ratio A/B of the core sleeve to the R-T-B magnet powder was 1 (A=0.9, and B=0.9). The ring-shaped green body holding the cylindrical body therein was then sintered on a Mo plate in a Mo container. A heat treatment was further conducted to obtain a sintered ring magnet having an outer diameter of 41.5 mm, an inner diameter of 33.0 mm and a height of 42.0 mm, with grooves on the inner surface each having a depth of 0.7 mm and R of 3.0 mm.

Production of Sintered Body 202 (Example within the Present Invention)

A radially anisotropic, sintered ring magnet was produced by the same method as producing the sintered body 201, except for changing its shape to an outer diameter of 71.6 mm, an inner diameter of 62.6 mm and a height of 32.0 mm, with grooves on the inner surface each having a depth of 0.9 mm and R of 0.4 mm.

Production of Sintered Body 203 (Example within the Present Invention)

A radially anisotropic, sintered ring magnet was produced by the same method as producing the sintered body 201, except for changing its shape to an outer diameter of 101.7 mm, an inner diameter of 90.7 mm and a height of 36.5 mm, with grooves on the inner surface each having a depth of 0.95 mm and R of 0.4 mm.

Production of Sintered Body 204 (Comparative Example)

A radially anisotropic, sintered ring magnet was produced by the same method as producing the sintered body 201, except for using a core sleeve 45 made of non-magnetic cemented carbide. In a magnetic field during molding, a magnetic flux density ratio A/B of the core sleeve to the R-T-B magnet powder was 0.4. Used for the magnetic flux density of the non-magnetic core sleeve in a magnetic field of 318 kA/m was A=0.4 T, which was calculated assuming that the non-magnetic body had permeability equal to that of vacuum.

With respect to the sintered bodies 201-204, the degree of outer surface deformation was evaluated in the same manner as in Example 1. With respect to the sintered bodies of Example 2, the structure of the die used for molding in a magnetic field, and the degree of outer surface deformation are shown in Table 3.

TABLE 3

| Sintered Body | Core | Die Core Sleeve | Outer Die Sleeve | Outer Die Part | Roundness/ Diameter of Magnet |
|---|---|---|---|---|---|
| 201* | Permendur | G7 | Non-magnetic cemented carbide | SK3 | 0.0013 |
| 202* | Permendur | G7 | Non-magnetic cemented carbide | SK3 | 0.0015 |
| 203* | Permendur | G7 | Non-magnetic cemented carbide | SK3 | 0.0014 |
| 204** | Permendur | Non-magnetic cemented carbide | Non-magnetic cemented carbide | SK3 | 0.0067 |

Note:
*indicates Examples within the present invention, and **indicates Comparative Example.

In the sintered bodies 201-203 (within the present invention) produced by using a magnetic core sleeve, outer surface deformation was suppressed for the same reason as the sintered bodies 101-104 (within the present invention) of Example 1. In the sintered body 204 (Comparative Example) produced by using a core sleeve 45 made of non-magnetic cemented carbide, deformation occurred on the outer peripheral surface due to disturbance in the orientation of magnet powder.

Production of Radially Anisotropic Ring Magnet

The outer, inner and end surfaces of the sintered ring magnets 201 and 204 were ground to produce radially anisotropic ring magnets 201 and 204 each having an outer diameter of 40 mm, an inner diameter of 34.0 mm and a height of 40 mm, with grooves on the inner surface each having a depth of 0.2 mm and R of 3.0 mm.

The outer, inner and end surfaces of the sintered ring magnet 202 were ground to produce a radially anisotropic ring magnet 202 having an outer diameter of 70 mm, an inner diameter of 64 mm and a height of 30 mm, with grooves on the inner surface each having a depth of 0.2 mm and R of 0.4 mm.

The outer, inner and end surfaces of the sintered ring magnet 203 were ground to produce a radially anisotropic ring magnet 203 having an outer diameter of 100 mm, an inner diameter of 92 mm and a height of 35 mm, with grooves on the inner surface depth of 0.3 mm and R of 0.4 mm.

Example 3

Production of Rotor 301 (Example within the Present Invention)

Figure 10:
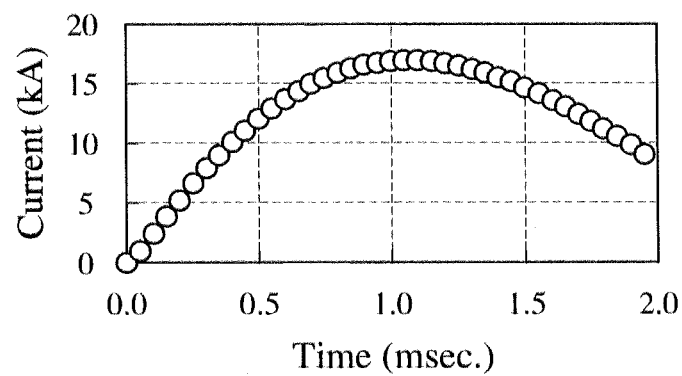
FIG. 10 is a graph showing a current waveform for magnetization in Example 4.

A rotor yoke was inserted into the radially anisotropic ring magnet 101 produced in Example 1 and bonded thereto with an adhesive. The rotor yoke 150 had axially ridges on the outer surface at positions corresponding to grooves on the inner surface of the ring magnet. Using a magnetizing yoke 130 comprising a coil 140 as shown in FIG. 18, the radially anisotropic magnet 120 was magnetized in a skew magnetization pattern, in which centerlines 180 of magnetic poles crossed centerlines 111 of grooves 110 on the inner surface at a skew angle of 15° as shown in FIG. 4. Magnetization was conducted with a capacitor having capacitance of 8000 μF under the conditions of charging voltage of 2500 V and magnetization current of 16.84 kA in a pattern shown in FIG. 10.

Production of Rotor 302 (Comparative Example)

The radially anisotropic ring magnet 106 produced in Example 1 was magnetized by the same method as for the rotor 301. The resultant rotor was measured with respect to a surface magnetic flux density, and peak values of the surface magnetic flux densities on 8 poles (four N poles and four S poles) were averaged and shown in Table 4. The surface magnetic flux density of the rotor 301 was about 6% higher than that of the rotor 302. Because the radially anisotropic ring magnet 106 used in the rotor 302 was molded in a magnetic field using a core sleeve made of non-magnetic cemented carbide, disturbance occurred in orientation near the ridges due to difference in a magnetic flux density between the core sleeve and the magnet powder. Also, because the non-magnetic sleeve acted substantially like a magnetic gap, the degree of orientation did not improve, resulting in a low surface magnetic flux density.

The magnet produced by the method of the present invention was at least 6% thinner than those produced using a non-magnetic sleeve, contributing to the saving of natural resources by reducing the amount of the rare earth element as a magnet-forming material.

TABLE 4

| Measurement Position | Surface Magnetic Flux Density (T) | |
|---|---|---|
| | Rotor 301 (Example Within Present Invention) | Rotor 302 (Comparative Example) |
| N Pole | 0.310 | 0.292 |
| S Pole | 0.312 | 0.291 |

Note:
The surface magnetic flux density (T) was obtained by averaging peak values for each of four N poles and four S poles.

Example 4

Production of Rotor 401 (Example within the Present Invention)

A rotor yoke 150 was inserted into the radially anisotropic ring magnet 101 produced in Example 1 and bonded with an adhesive. The rotor yoke 150 had axially ridges on the outer surface at positions corresponding to grooves on the inner surface of the ring magnet. Using a magnetizing yoke 130 comprising a coil 140 as shown in FIG. 18, the radially anisotropic ring magnet was magnetized in a skew magnetization pattern, in which centerlines 180 of magnetic poles crossed centerlines 111 of grooves 110 on the inner surface of the ring magnet 120 at a skew angle of 15° as shown in FIG. 4. Magnetization was conducted with a capacitor having capacitance of 8000 μF under the conditions of charging voltage of 2500 V and magnetization current of 16.84 kA in a pattern shown in FIG. 10.

Production of Rotor 402 (Reference Example)

Figure 11:
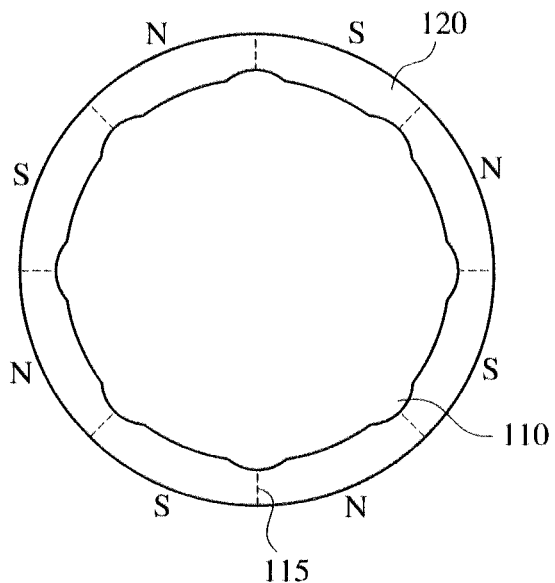
FIG. 11 is a cross-sectional view showing the rotor 402 of Example 4, which is magnetized under such condition that grooves overlap centerlines between magnetic poles.

A rotor was produced by the same method as producing the rotor 401, except for magnetizing the radially anisotropic ring magnet 101 produced in Example 1 at a skew angle of 15° between grooves 110 on the inner surface and centerlines between magnetic poles 115 as shown in FIG. 11.

Production of Rotor 403 (Comparative Example)

A radially anisotropic ring magnet free from grooves on the inner surface was produced by the same method as producing the radially anisotropic ring magnet 101 in Example 1, except for using a die comprising a Permendur-made circular core free from axial ridges. After a rotor yoke free from axial ridges on the outer surface was inserted into the resultant ring magnet, the ring magnet free from grooves on the inner surface was magnetized at arbitrary positions in a skew magnetization pattern having a skew angle of 15° under the same conditions as for the rotor 401.

Figure 12:
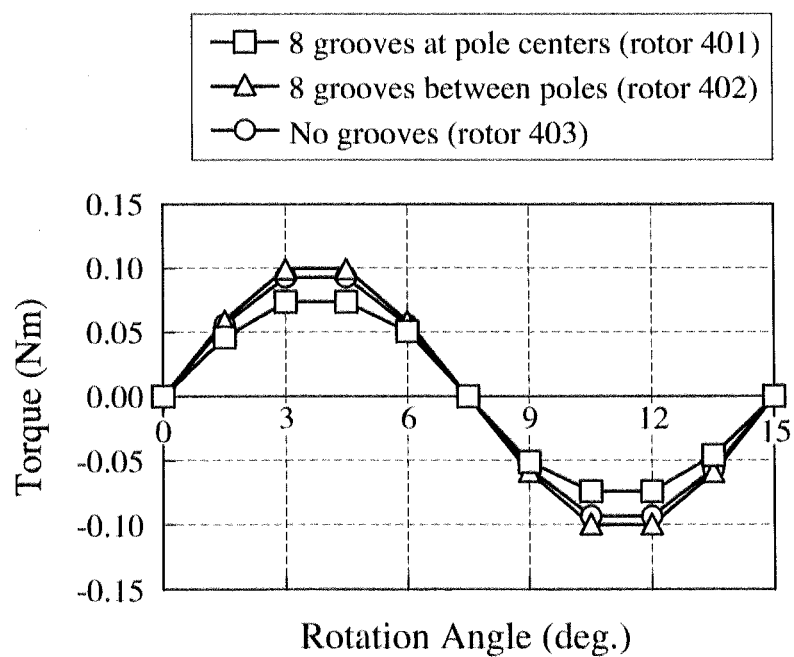
FIG. 12 is a graph showing cogging torque measured on rotors 401-403 produced in Example 4.

Each rotor 401-403 was assembled in a stator yoke having 12 slots to measure cogging torque. A gap between the stator yoke and the outer surface of the magnet was 0.5 mm. The measurement results of cogging torque are shown in FIG. 12 and Table 5. Although cogging torque was slightly (8%) higher in the rotor 402 having grooves on the inner surface 110, which was magnetized such that centerlines between magnetic poles 115 overlapped the grooves, than in the rotor 403 free from grooves on the inner surface, the rotor 401 having magnetic poles at centers of the grooves on the inner surface had remarkably reduced cogging torque (20% reduction).

TABLE 5

| Rotor | Grooves on Inner Surface | Positions of Magnetic Poles | Cogging Torque [Nm] |
|---|---|---|---|
| 401 | Yes (Eight) | Grooves on the inner surface overlapped magnetic poles | 0.150 (0.80) |
| 402 | Yes (Eight) | Grooves on the inner surface overlapped centerlines between magnetic poles | 0.203 (1.08) |
| 403 | None | — | 0.188 (1.00) |

Note:
The value in the parenthesis is a relative value of cogging torque, assuming that the cogging torque of the rotor 403 is 1.00.

With respect to rotors each obtained by magnetizing each of the radially anisotropic ring magnets 102-104 of Example 1 and the radially anisotropic ring magnets 201-203 of Example 2 such that centerlines 180 of magnetic poles crossed centerlines 111 of grooves on the inner surface of the ring magnet like the rotor 401, too, the measurement of cogging torque revealed that they were equivalent to the rotor 401.

EFFECT OF THE INVENTION

Because the radially anisotropic ring magnet of the present invention is free from disturbance in the orientation of magnet powder near grooves on the inner surface, it does not suffer large cogging torque when used for rotors for brushless motors. Further, the engagement of grooves on the ring magnet with axial ridges on the rotor yoke surely prevents the relative movement of the ring magnet to the rotor yoke.

Because radially anisotropic ring magnets having grooves on the inner surface, which are produced by the die and method of the present invention, do not suffer disturbance in the orientation of magnet powder during molding in a magnetic field, they do not have large cogging torque when used for rotors for brushless motors, and have excellent roundness in the outer surface.

The rotor of the present invention for a brushless motor does not suffer large cogging torque and the relative rotation of a ring magnet, exhibiting high quality and reliability.

What is claimed is:

1. A method for producing a radially anisotropic ring magnet having at least one axial groove on the inner surface, comprising using a die comprising a cylindrical, magnetic core, a magnetic core sleeve having an axial ridge in alignment with said groove on the outer surface and disposed around said magnetic core, and an outer, cylindrical, magnetic die member defining a cavity for forming said radially anisotropic ring magnet with said magnetic core sleeve, and compression-molding magnet powder charged into said cavity while applying a magnetic field in a radial direction.

2. The method according to claim 1, wherein a magnetic flux density A in said magnetic core sleeve and a magnetic flux density B in said magnet powder in a magnetic field applied during said compression molding meet the relation of $0.65 \leq A/B \leq 1.2$.

3. The method according to claim 1, wherein said magnetic core and said outer, magnetic die member have $4\pi Is$ of more than 1.7 T.

4. The method according to claim 1, wherein said radially anisotropic ring magnet is substantially composed of R-TM-B, wherein R is at least one of rare earth elements including Y, TM is at least one of transition metals, and B is boron.

5. The method according to claim 1, further comprising the step of machining other portions than said groove on the inner surface of said radially anisotropic ring magnet to a predetermined inner diameter.

6. A die for the production of a radially anisotropic ring magnet having at least one axial groove on the inner surface, comprising a cylindrical, magnetic core, a magnetic core sleeve disposed around said magnetic core, and an outer, cylindrical, magnetic die member for defining a cavity for forming said radially anisotropic ring magnet with said magnetic core sleeve, said magnetic core sleeve having an axial ridge in alignment with said groove on the outer surface.

7. A radially anisotropic ring magnet produced by the method recited in claim 1.

8. The radially anisotropic ring magnet according to claim 7, which is magnetized such that said groove does not overlap centerlines between magnetic poles.

9. A rotor for a brushless motor comprising the radially anisotropic ring magnet recited in claim 7, and a rotor yoke having an axial ridge in alignment with at least one groove of said radially anisotropic ring magnet, both concentrically fixed to each other.

\* \* \* \* \*